United States Patent
Weinstein (10) Patent No.: US 8,327,717 B2
(45) Date of Patent: *Dec. 11, 2012

(54) VERY HIGH FREQUENCY VIBRATORY FLOW METER

(75) Inventor: Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/936,646

(22) PCT Filed: Apr. 29, 2009

(86) PCT No.: PCT/US2009/042016
§ 371 (c)(1),
(2), (4) Date: Oct. 6, 2010

(87) PCT Pub. No.: WO2009/134827
PCT Pub. Date: Nov. 5, 2009

(65) Prior Publication Data
US 2011/0036179 A1    Feb. 17, 2011

Related U.S. Application Data

(60) Provisional application No. 61/049,664, filed on May 1, 2008.

(51) Int. Cl.
*G01F 1/84* (2006.01)
(52) U.S. Cl. .................................................. 73/861.356
(58) Field of Classification Search ............... 73/861.23, 73/861.357
See application file for complete search history.

(56) References Cited

U.S. PATENT DOCUMENTS

| | | | |
|---|---|---|---|
| 6,408,700 B1 | 6/2002 | Matt et al. | |
| 7,360,453 B2 | 4/2008 | Rieder et al. | |
| 7,412,903 B2 | 8/2008 | Rieder et al. | |
| 2004/0040387 A1 | 3/2004 | Nakao et al. | |
| 2007/0001028 A1 | 1/2007 | Gysling | |

FOREIGN PATENT DOCUMENTS

| | | |
|---|---|---|
| EP | 0733886 B1 | 8/2004 |
| RU | 2295120 C2 | 3/2007 |
| WO | 0169040 A1 | 9/2001 |
| WO | 03095949 A1 | 11/2003 |
| WO | 2004063741 A2 | 7/2004 |
| WO | 2006107297 A1 | 10/2006 |
| WO | 2007022118 A1 | 2/2007 |

OTHER PUBLICATIONS

U.S. Appl. No. 12/937,442, Weinstein, filed Oct. 6, 2010.*
U.S. Appl. No. 12/937,587, Weinstein, filed Oct. 13, 2010.*

* cited by examiner

*Primary Examiner* — Jewel V Thompson
(74) *Attorney, Agent, or Firm* — The Ollila Law Group LLC (57) ABSTRACT

A very high frequency vibratory flow meter (100) is provided. The very high frequency vibratory flow meter (100) includes a flow meter assembly (10) including one or more flow conduits (103A, 103B). The flow meter assembly (10) is configured to generate a very high frequency response that is above a predetermined maximum decoupling frequency for the flow fluid independent of a foreign material size or a foreign material composition. The very high frequency vibratory flow meter (100) further includes meter electronics (20) coupled to the flow meter assembly (10) and configured to receive the very high frequency vibrational response and generate one or more flow measurements therefrom.

30 Claims, 4 Drawing Sheets

VERY HIGH FREQUENCY VIBRATORY FLOW METER

CROSS-REFERENCE TO RELATED APPLICATIONS

This is a National Stage entry of International Application No. PCT/US2009/042016, with an international filing date of Apr. 29, 2009, which claims priority of U.S. provisional patent application No. 61/049,664, filed May 1, 2008 entitled "METHOD AND APPARATUS FOR DETERMINING PARAMETERS IN A MULTIPHASE FLOW".

BACKGROUND OF THE INVENTION

1. Field of the Invention

The present invention relates to a vibratory flow meter, and more particularly, to a very high frequency vibratory flow meter.

2. Statement of the Problem

Vibratory flow meters, such as Coriolis mass flow meters and vibratory densitometers, typically operate by detecting motion of a vibrating conduit that contains a flowing or non-flowing fluid. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical vibratory flow meter includes one or more conduits that are connected inline in a pipeline or other transport system and convey material, e.g., fluids, slurries and the like, in the system. A conduit may be viewed as having a set of natural vibration modes, including for example, simple bending, torsional, radial, and coupled modes. In a typical measurement application, a conduit is excited in one or more vibration modes as a material flows through the conduit and motion of the conduit is measured at points spaced along the conduit. Excitation is typically provided by an actuator, e.g., an electromechanical device, such as a voice coil-type driver, that perturbs the conduit in a periodic fashion. Fluid density may be obtained by determining a resonant frequency of the flow fluid. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Flow meters are used to perform mass flow rate and/or density measurements for a wide variety of fluid flows and offer high accuracy for single phase flows. One area in which vibratory flow meters are used is in the metering of oil and gas well outputs. The product of such wells can comprise a multi-phase flow, including liquids but also including gases and/or solids that can be entrained in the flow fluid. An oilfield flow fluid therefore can include oil, water, air or other gases, and/or sand or other soil particulates, for example. However, when a vibratory flow meter is used to measure flow fluids including entrained gases and/or solids, the accuracy of the meter can be significantly degraded. It is highly desirable that the resulting metering be as accurate as possible, even for such multi-phase flows.

The multi-phase flow fluids can include entrained gases, especially bubbly gas flows. The multi-phase flows can include entrained solids or entrained solid particles, mixtures such as concrete, etc. Further, multi-phase flows can include liquids of different densities, such as water and petroleum components, for example. The phases may have different densities, viscosities, or other properties.

In a multi-phase flow, the vibration of a flow conduit does not necessarily move the entrained gases/solids completely in phase with the flow fluid. This vibrational anomaly is referred to as decoupling or slippage. Gas bubbles, for example, can become decoupled from the flow fluid, affecting the vibrational response and any subsequently derived flow characteristics. Small bubbles typically move with the flow fluid as the flow meter is vibrated. However, larger bubbles do not move with the flow fluid during vibration of the flow conduit. Instead, the bubbles can be decoupled from the flow fluid and can move independently, with entrained gas bubbles moving farther and faster than the flow fluid during each vibrational movement. This adversely affects the vibrational response of the flowmeter. This is also true of solid particles entrained in the flow fluid, where the solid particles are increasingly likely to decouple from the motion of the flow fluid at increasing particle sizes or vibrational frequencies. The decoupling may even occur where the multi-phase flow includes liquids of differing densities and or viscosities. The decoupling action has been found to be affected by various factors, such as the viscosity of the flow fluid and the difference in density between the flow fluid and the foreign material, for example.

In addition to problems caused by the relative motion of bubbles and particles, Coriolis meters can experience accuracy degradation from speed of sound (SOS), or compressibility, effects when the sonic velocity of the measurement fluid is low or the oscillation frequency of the meter is high. Liquids have higher sonic velocities than gases, but the lowest velocities result from a mixture of the two. Even a small amount of gas entrained in a liquid results in a dramatic reduction in the speed of sound of the mixture; below that of either phase.

The oscillation of the flow tube produces sound waves that oscillate in the transverse direction at the drive frequency of the meter. When the speed of sound of the fluid is high, as in a single phase fluid, the first acoustic mode for transverse sound waves across the circular conduit is at a much higher frequency than the drive frequency. However, when the speed of sound drops due to the addition of gas to a liquid, the frequency of the acoustic mode also drops. When the frequency of the acoustic mode and the drive mode are close, meter errors result due to the off-resonance excitation of the acoustic mode by the drive mode.

For low frequency meters and typical process pressures, velocity of sound effects are present in multiphase flows but are usually negligible with respect to the specified accuracy of the meter. However, for high frequency Coriolis meters operating at low pressures with bubbly fluids, the velocity of sound can be low enough to cause significant measurement errors due to interaction between the drive and fluid vibration modes.

The size of the bubbles can vary, depending on the amount of gas present, the pressure of the flow fluid, temperature, and the degree of mixing of the gas into the flow fluid. The extent of the decrease in performance is not only related to how much total gas is present, but also to the size of the individual gas bubbles in the flow. The size of the bubbles affects the accuracy of the measurement. Larger bubbles occupy more volume and decouple to a further extent, leading to fluctuations in the measured density of the flow fluid. Due to the compressibility of a gas, the bubbles can change in gas amount, or mass, yet not necessarily change in size. Conversely, if the pressure changes, the bubble size can correspondingly change, expanding as the pressure drops or shrinking as the pressure increases. This can also cause variations in the natural or resonant frequency of the flow meter.

Prior art vibratory flow meters are typically designed for operating frequencies around 100 to 300 Hertz (Hz), with some meters operating at frequencies between 500 and 1,000 Hz. Some prior art meters are designed to operate at higher frequencies. The operating frequency in a prior art vibratory flow meter is typically chosen in order to facilitate the flow meter design, production, and operation. For example, a prior art vibratory or Coriolis flow meter is configured to be physically compact and substantially uniform in dimensions. For example, a height of a prior art flow meter is typically less than the length, giving a low height-to-length aspect ratio (H/L) and a corresponding high drive frequency. Flow meter users prefer a small overall size so that installation is simplified. Further, flow meter design commonly assumes a uniform, single-phase fluid flow and is designed to optimally operate with such a uniform flow fluid.

A straight conduit flow meter has a height-to-length aspect ratio of zero, which typically produces a high drive frequency. Bowed flow conduits are often used to keep the length from being the dominant dimension and will increase the height-to-length aspect ratio (H/L). A curved or bowed conduit flow meter in the prior art may have a height-to-length aspect ratio approaching 1.3, for example.

There remains a need in the art for a vibratory flow meter that is capable of accurately and reliably measuring multi-phase flow fluids.

ASPECTS OF THE INVENTION

In one aspect of the invention, a very high frequency vibratory flow meter comprises:
 a flow meter assembly including one or more flow conduits, with the flow meter assembly being configured to generate a very high frequency response that is above a predetermined maximum decoupling frequency for the flow fluid independent of a foreign material size or a foreign material composition; and
 meter electronics coupled to the flow meter assembly and configured to receive the very high frequency vibrational response and generate one or more flow measurements therefrom.

Preferably, the meter electronics is configured such that a decoupling ratio $(A_p/A_f)$ is about 3:1 for entrained gas at the very high frequency.

Preferably, the meter electronics is configured such that a decoupling ratio $(A_p/A_f)$ is about equal to the quantity $3/(1+(2*\rho_p/\rho_f))$ for entrained solids at the very high frequency.

Preferably, the meter electronics is configured such that a viscosity is effectively zero with regard to particle motion for the flow fluid at the very high frequency.

Preferably, the very high frequency is above about 1,500 Hertz (Hz).

Preferably, the very high frequency vibrational response corresponds to an inverse Stokes number ($\delta$) that is less than about 0.1.

Preferably, the very high frequency is above about 2,000 Hertz (Hz).

Preferably, the one or more flow conduits are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the very high frequency vibratory flow meter is configured to operate at a first bending mode.

Preferably, the very high frequency vibratory flow meter is configured to operate at higher bending mode frequencies.

In one aspect of the invention, a method of operating a very high frequency vibratory flow meter comprises:
 vibrating one or more flow conduits of the very high frequency vibratory flow meter at a very high frequency, wherein the very high frequency is above a predetermined maximum decoupling frequency for the flow fluid independent of a foreign material size or a foreign material composition;
 receiving a very high frequency vibrational response; and
 generating one or more flow measurements from the very high frequency vibrational response.

Preferably, the very high frequency vibratory flow meter is configured such that a decoupling ratio $(A_p/A_f)$ is about 3:1 for entrained gas at the very high frequency.

Preferably, the very high frequency vibratory flow meter is configured such that a decoupling ratio $(A_p/A_f)$ is about equal to the quantity $3/(1+(2*\rho_p/\rho_f))$ for entrained solids at the very high frequency.

Preferably, the very high frequency vibratory flow meter is configured such that a viscosity is effectively zero with regard to particle motion for the flow fluid at the very high frequency.

Preferably, the very high frequency is above about 1,500 Hertz (Hz).

Preferably, the very high frequency vibrational response corresponds to an inverse Stokes number ($\delta$) that is less than about 0.1.

Preferably, the very high frequency is above about 2,000 Hertz (Hz).

Preferably, one or more flow conduits of the very high frequency vibratory flow meter are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the very high frequency vibratory flow meter is configured to operate at a first bending mode.

Preferably, the very high frequency vibratory flow meter is configured to operate at higher bending mode frequencies.

In one aspect of the invention, a method of forming a very high frequency vibratory flow meter comprises:
 determining a predetermined very high frequency for the vibratory flow meter based on at least an expected flow fluid, wherein the very high frequency is above a predetermined maximum decoupling frequency for the flow fluid independent of a foreign material size or a foreign material composition;
 configuring the very high frequency vibratory flow meter to operate at the very high frequency; and
 constructing the very high frequency vibratory flow meter.

Preferably, the meter electronics is configured such that a decoupling ratio $(A_p/A_f)$ is about 3:1 for entrained gas at the very high frequency.

Preferably, the meter electronics is configured such that a decoupling ratio $(A_p/A_f)$ is about equal to the quantity $3/(1+(2*\rho_p/\rho_f))$ for entrained solids at the very high frequency.

Preferably, the meter electronics is configured such that a viscosity is effectively zero with regard to particle motion for the flow fluid at the very high frequency.

Preferably, the very high frequency is above about 1,500 Hertz (Hz).

Preferably, the very high frequency vibrational response corresponds to an inverse Stokes number (δ) that is less than about 0.1.

Preferably, the very high frequency is above about 2,000 Hertz (Hz).

Preferably, the one or more flow conduits are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the very high frequency vibratory flow meter is configured to operate at a first bending mode.

Preferably, the very high frequency vibratory flow meter is configured to operate at higher bending mode frequencies.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
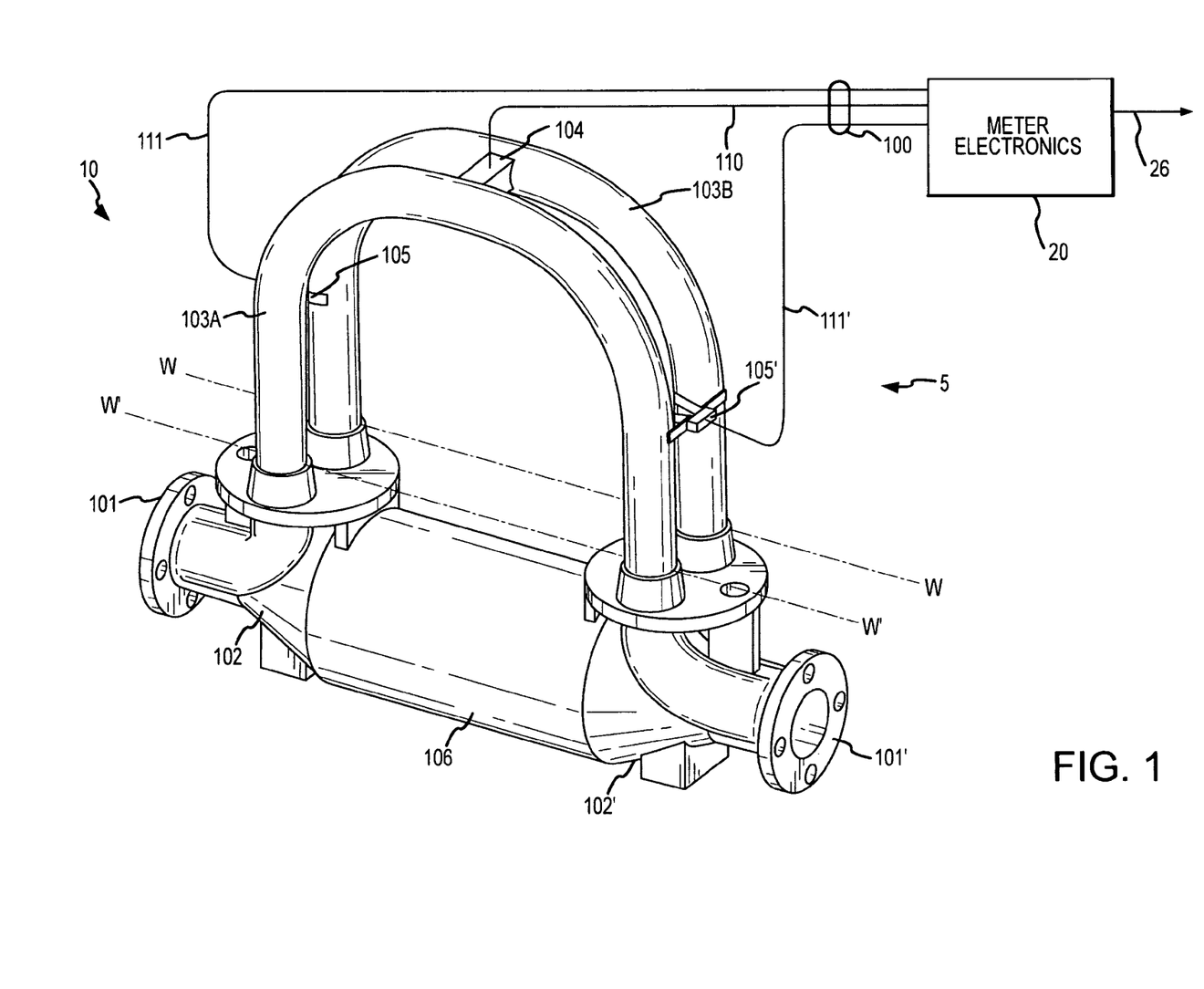
FIG. 1 shows a very high frequency vibratory flow meter according to the invention.

FIG. 1 shows a very high frequency vibratory flow meter 5 according to the invention. The very high frequency vibratory flow meter 5 in one embodiment comprises a Coriolis flowmeter. In another embodiment, the very high frequency vibratory flow meter 5 comprises a vibrating densitometer.

The very high frequency vibratory flow meter 5 is designed to measure fluid characteristics of a flow fluid, including measuring either a flowing or stationary flow fluid. The very high frequency vibratory flow meter 5 is further designed to accurately and reliably measure the flow fluid when the flow fluid comprises multiple phases. The multi-phase flow fluid can include entrained gas in some embodiments, wherein the entrained gas can comprise a bubbly flow. The entrained gas can include air bubbles or bubbles of various sizes. Entrained gas is problematic in prior art vibratory flow meters. The entrained gas, especially for moderate to large bubbles, can move independently of the flow fluid and cause measurement errors or uncertainties. In addition, the entrained gas can cause varying measurement effects due to compressibility of the gas varying with the operating pressure of the flow fluid.

The multi-phase flow fluid can include entrained solids in some embodiments, wherein the entrained solids can comprise a slurry. One example comprises sand or soil particles in a petroleum flow. The entrained solids can move independently of the flow fluid and cause measurement errors and/or uncertainties. Another example is concrete. Other slurries or emulsions are contemplated and are within the scope of the description and claims.

In some embodiments, the multi-phase flow can include differing liquids, such as immiscible liquids that cannot be mixed together. For example, the flow fluid can include both water and oil. Where the fluid flow components have differing densities, the fluid flow components may experience some decoupling during flow meter vibration. The foreign objects can be less dense than the flow fluid. The foreign objects can be denser than the flow fluid.

In operation, the very high frequency vibratory flow meter 5 is vibrated at a very high frequency. The very high frequency can comprise a first bending mode vibration. Alternatively, the very high frequency can comprise a second, third, or higher bending mode vibration. However, other vibrations, such as off-resonance vibrations, are contemplated and are within the scope of the description and claims. As a result, the very high frequency vibratory flow meter 5 produces a very high frequency vibrational response. The very high frequency vibrational response is processed in order to determine one or both of a response frequency and a response amplitude. The very high response frequency can be used to determine one or more flow fluid characteristics, including a mass flow rate, density, viscosity, et cetera. The very high frequency nature of the flow meter 5 is discussed further below.

The flow meter 5 includes a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of vibratory flow meter regardless of the number of drivers, pick-off sensors, flow conduits, or the operating mode of vibration. It should be recognized that the flow meter 5 can comprise a vibratory densitometer and/or a Coriolis mass flow meter.

The flow meter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

In one embodiment, the flow conduits 103A and 103B comprise substantially U-shaped flow conduits, as shown. Alternatively, in other embodiments, the flow conduits can comprise substantially straight flow conduits. However, other shapes can also be used and are within the scope of the description and claims.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow fluid being measured, the flow fluid enters the flow meter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flow meter 5. However, the flow conduits 103A and 103B can alternatively be vibrated at a second bending mode or higher, if desired. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output that allows the meter electronics 20 to interface with an operator or with other electronic systems. The description of FIG. 1 is provided merely as an example of the operation of a vibratory flow meter and is not intended to limit the teaching of the present invention.

Figure 2:
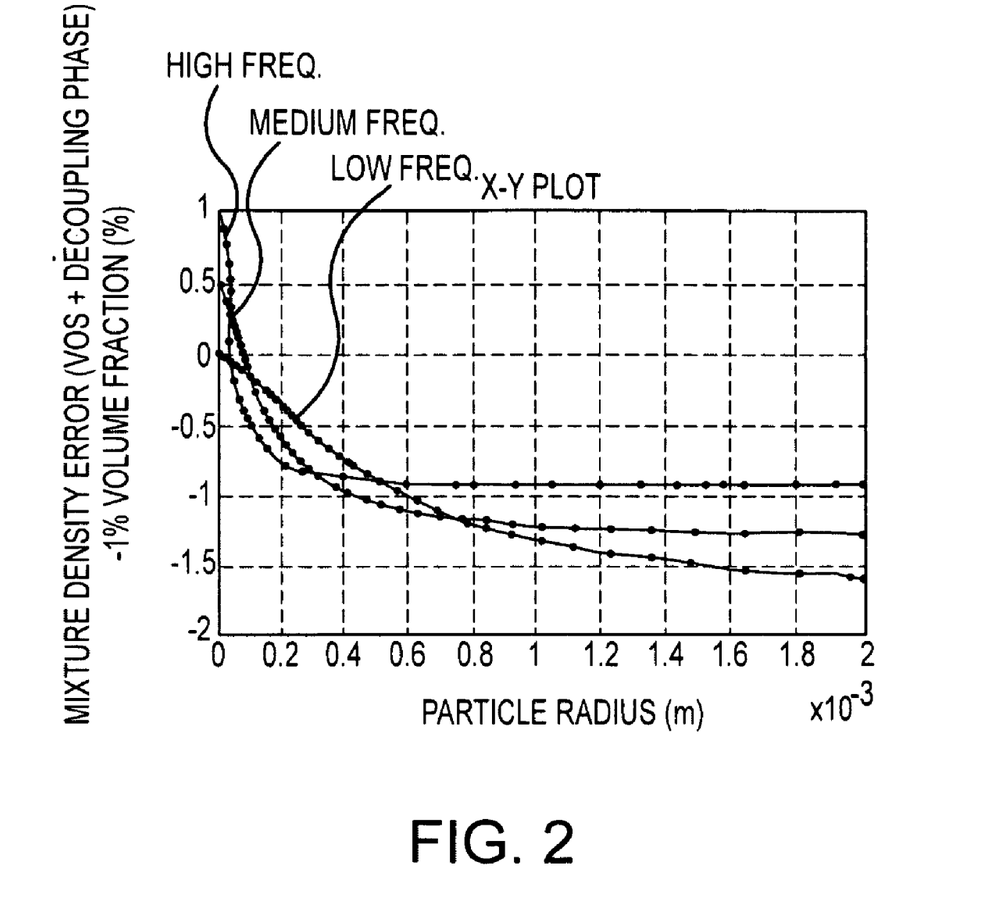
FIG. 2 is a chart that shows simulation results of total density error from a very low frequency mode and a very high frequency mode of a Micro Motion model E200 Coriolis flow meter.

FIG. 2 is a chart that shows simulation results of total density error from the very low frequency mode and the very high frequency mode of a Micro Motion model E200 Coriolis flow meter. It can be seen that at very small particle sizes, any decoupling is negligible, such as where the decoupling ratio $(A_p/A_f)$ is approximately one and the density error is correspondingly insignificant. In this small particle scenario, speed of sound (SOS)/compressibility effects dominate. As a result, the high frequency mode has a positive error and the low frequency mode does not have much error at all.

However, when bubbles get bigger than a few tenths of a millimeter in diameter, decoupling effects begin to dominate the SOS/compressibility effects and the error goes negative. Note that as particle size increases, the observed error will asymptotically converge to the inviscid model results, i.e., at an about 3:1 decoupling ratio $(A_p/A_f)$. This asymptote happens earlier in terms of bubble size when the oscillation frequency is high. Therefore, if a meter is vibrated at a high enough frequency, then equation (14) can be employed (see below). Equation (14) is independent of bubble size and flow fluid viscosity.

Figure 3:
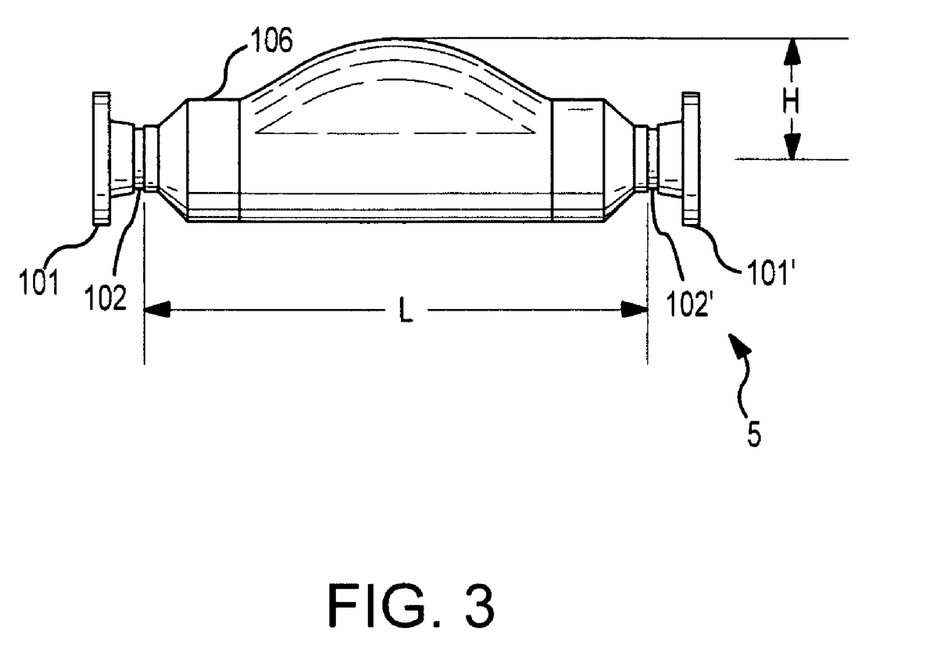
FIG. 3 shows a very high frequency vibratory flow meter according to an embodiment of the invention.

FIG. 3 shows a very high frequency vibratory flow meter 5 according to an embodiment of the invention. The very high frequency can be based on an effective length of the one or more flow conduits 103A, 103B and the geometry of the flow meter 5, as previously discussed. The effective length in some embodiments can be controlled by the flow conduit geometry. In addition, the drive frequency can be further affected by one or more balance masses that can optionally be affixed to the one or more flow conduits 103A, 103B, as needed.

In the figure, the flow meter 5 has a large length L in proportion to a relatively small height H. The very high frequency vibratory flow meter 5 therefore may have a low height-to-length aspect ratio (H/L). For example, a height-to-length aspect ratio (H/L) may be less than or much less than one. Therefore, the very high frequency vibratory flow meter 5 according to the invention is relatively small and therefore easy to accommodate in most metering applications In some embodiments, the very high frequency comprises a vibration frequency above 1,500 Hz. In some embodiments, the very high frequency comprises a vibration frequency above 2,000 Hz. In some embodiments, the very high frequency comprises a vibration frequency above 3,000 Hz and beyond. However, it should be understood that the vibration frequency can be at any frequency above these thresholds, as the required very high frequency will ultimately depend on various factors, including the flow fluid composition and the nature of the entrained foreign material, for example.

Figure 4:
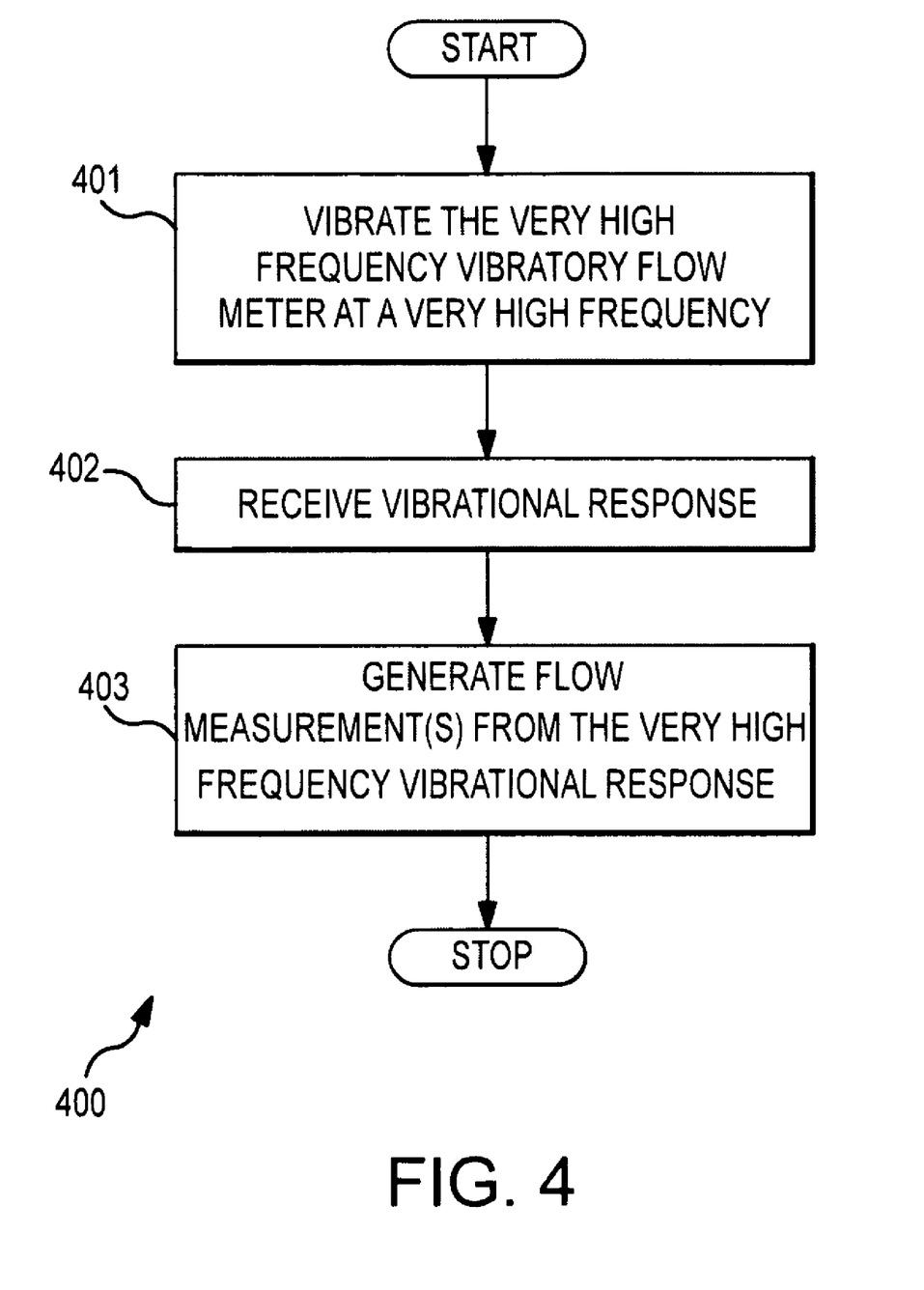
FIG. 4 is a flowchart of a method of operating a very high frequency vibratory flow meter according to the invention.

FIG. 4 is a flowchart 400 of a method of operating a very high frequency vibratory flow meter according to the invention. In step 401, the flow meter is vibrated at a very high frequency. The very high frequency can include a frequency where a decoupling ratio $(A_p/A_f)$ of about 3:1 for entrained gas is achieved. The very high frequency can include a frequency where a decoupling ratio $(A_p/A_f)$ of about 0:1 for entrained solids at the very high frequency. The very high frequency can include a frequency where an effective viscosity of about zero is achieved for the flow fluid. The very high frequency can include a frequency where the very high frequency is above a predetermined maximum decoupling frequency, independent of a foreign material size or a foreign material composition. The very high frequency can include a frequency where the very high frequency is above a predetermined maximum SOS/compressibility threshold, independent of a foreign material size or a foreign material composition. The very high frequency can include a frequency above about 1,500 Hertz (Hz). The very high frequency can include a frequency above about 2,000 Hertz (Hz).

One or more flow conduits of the very high frequency vibratory flow meter are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions, as previously discussed.

The very high frequency vibratory flow meter can be configured to operate at a first bending mode. The very high frequency vibratory flow meter can be configured to operate at one or more bending modes, such as a second or third bending mode or higher.

In step 402, a vibrational response of the flow meter assembly is received. The vibrational response can be used to determine a resulting frequency and amplitude, including a frequency that can comprise a resonant frequency for the flow fluid or an off-resonance frequency.

In step 403, one or more flow measurements can be generated from the very high frequency vibrational response. The one or more flow measurements can include a mass flow rate. The one or more flow measurements can include a density. A density measurement achieved with the very high frequency can be determined using assumptions as to the decoupling ratio and the fluid viscosity. Other flow measurements are contemplated and are within the scope of the description and claims.

The drive frequency is the frequency at which the one or more flow conduits 103A and 103B are vibrated in order to measure flow characteristics of the flow fluid. The drive frequency can be selected to be at a flow fluid resonant frequency, for example, or can comprise one or more resonant frequency harmonics, higher bending mode frequencies, or even off-resonance frequencies. Therefore, the drive frequency can differ from a vibrational response frequency received from a flow meter assembly 10 and can vary according to the makeup of the flow fluid. In addition, the drive frequency is affected by the stiffness characteristic of the flowmeter. As the stiffness characteristic increases, the drive frequency will increase. As a result, increasing the flow conduit stiffness will result in a higher flow conduit resonant frequency and therefore an increased flow meter frequency. The flow conduit stiffness can be increased in a variety of ways, as discussed below.

A very high vibrational frequency can be achieved by vibrating the flow meter assembly 10 at a first bending mode. The first bending mode comprises a resonant frequency of the flow meter assembly 10, wherein the length of a flow conduit moves in a single direction. Alternatively, the very high vibrational frequency can comprise vibrating the flow meter assembly 10 at a second bending mode. At the second bending mode, an additional vibration node exists on a flow conduit at about the center of the vibrating conduit portions. The conduit portions on either side of this vibrational node move in opposite directions.

In some embodiments, the very high frequency vibratory flow meter 5 can operate at a very high frequency as a result of flow meter design. In some embodiments, the very high frequency vibratory flow meter 5 can operate at a very high frequency as a result of the configuration of a drive signal.

A consequence of a multi-phase flow fluid is that accurate fluid measurements are affected and impeded during such multi-phase periods. The multi-phase effects may be present even in the presence of moderate to mild multi-phase flow conditions. The nature of the multi-phase flow fluid can manifest in compressibility/speed of sound (SOS) effects and in decoupling effects between components of the multi-phase flow fluid. The two effects can be controlled or eliminated by proper selection of vibrational frequency and amplitude.

The multi-phase flow fluids can include entrained gases, especially bubbly gas flows. The multi-phase flows can include entrained solids or entrained solid particles, mixtures such as concrete, slurries, etc. Further, multi-phase flows can include liquids of different densities, such as water and petroleum components, for example. The phases may have different masses, densities, and/or viscosities.

In a multi-phase flow, the vibration of a flow conduit does not necessarily move the entrained gases/solids completely in phase with the flow fluid. This vibrational anomaly is referred to as decoupling or slippage. Gas bubbles, for example, can become decoupled from the flow fluid, affecting the vibrational response and any subsequently derived flow characteristics. Small bubbles typically move with the flow fluid as the flow meter is vibrated. However, larger bubbles do not move with the flow fluid during vibration of the flow conduit. Instead, the bubbles can be decoupled from the flow fluid and can move independently, with entrained gas bubbles moving farther and faster than the flow fluid during each vibrational movement. This adversely affects the vibrational response of the flowmeter. This is also true of solid particles entrained in the flow fluid, where the solid particles are increasingly likely to decouple from the motion of the flow fluid at increasing vibrational frequencies. The decoupling may even occur where the multi-phase flow includes liquids of differing densities and/or viscosities. The decoupling action has been found to be affected by various factors, such as the viscosity of the flow fluid and the difference in density between the flow fluid and the foreign material, for example.

The size of the bubbles can vary, depending on the amount of gas present, the pressure of the flow fluid, temperature, the degree of mixing of the gas into the flow fluid, and other flow properties. The extent of the decrease in performance is not only related to how much total gas is present, but also to the size of the individual gas bubbles in the flow. The size of the bubbles affects the accuracy of the measurement. Larger bubbles occupy more volume, leading to fluctuations in the density and measured density of the flow fluid. Due to the compressibility of a gas, the bubbles can change in mass, yet not necessarily change in size. Conversely, if the pressure changes, the bubble size can correspondingly change, expanding as the pressure drops or shrinking as the pressure increases. This can also cause variations in the natural or resonant frequency of the flow meter.

In a vibrating conduit, the acceleration of the vibrating conduit causes the bubbles to move. The conduit acceleration is determined by the vibrational frequency and the vibrational amplitude. In the case of entrained gas, the bubbles are accelerated in the same direction as the conduit acceleration. The bubbles move faster and further than the flow conduit and the faster bubble motion and resulting fluid displacement causes some of the fluid to move more slowly than the flow conduit, causing a net shift in the center of gravity of the fluid mixture away from the center of the vibrating conduit. This is the basis of the decoupling problem. As a result, flow rate and density characteristics are under-reported (negative flow and density errors) when entrained air is present.

Slurries present a similar problem. In the case of slurries, however, the solid particles are often heavier than the liquid component. Under the acceleration of the vibrating conduit, the heavier particles move less than the liquid. But because the heavy particles move less, the center of gravity of the fluid mixture still moves slightly backwards from the center of the conduit. This again results in negative flow and density errors.

In the gas-liquid, solid-liquid, and liquid-liquid cases, the differential motion of the entrained phase is driven by the difference in density between the entrained phase and the liquid component. If the compressibility of the gas is neglected, then the same equations can be used to describe the behavior of all three scenarios.

Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. At a very low vibrational frequency, the flow fluid will act as a very viscous fluid, i.e., as if the viscosity is infinite. At a very high vibrational frequency, the flow fluid will act as a non-viscous fluid, i.e., as if the viscosity is approximately zero.

Viscosity is a measure of the resistance of a fluid which is being deformed by either shear stress or extensional stress. In general, it is the resistance of a liquid to flow, a quantification of the fluid's thickness. Viscosity may be thought of as a measure of fluid friction. All real fluids have some resistance to stress, but a fluid which has no resistance to shear stress is known as an ideal fluid or inviscid fluid.

Another influence on bubble mobility is the bubble size. The drag on a bubble is proportional to the surface area, whereas the buoyant force is proportional to the volume. Therefore, very small bubbles have a high drag to buoyancy ratio and tend to move with the fluid. Small bubbles subsequently cause small errors. Conversely, large bubbles tend not to move with the fluid and result in large errors. The same holds true for solid particles, as small particles tend to move with the fluid and cause small errors.

Another problem caused by vibration is speed of sound (SOS) or compressibility effects. These effects make mass flow and density measurements increasingly inaccurate for gassy flows as the vibrational frequency increases.

The density difference is another factor. A buoyant force is proportional to the difference in density between the fluid and the gas. A high pressure gas can have a high enough density to affect the buoyant force and reduce the decoupling effect. In addition, large bubbles occupy more volume, leading to true fluctuations in the density of the flow fluid. Due to the compressibility of a gas, the bubbles can change in gas quantity and yet not necessarily change in size. Conversely, if the pressure changes, the bubble size can correspondingly change, expanding as the pressure drops or shrinking as the pressure increases. This can also cause variations in the natural or resonant frequency of the flow meter and thus variations in the actual two-phase density.

Second order factors also can have an effect on bubble and particle mobility. The turbulence in a high flow rate fluid can break large gas bubbles into smaller ones, thus reducing decoupling error. Surfactants reduce the surface tension of bubbles and decrease their tendency to coalesce. Valves can decrease bubble size through increased turbulence while pipeline elbows can increase bubble size by forcing them together through centrifugal force.

It should be understood that the most common and least difficult and least expensive approach is to avoid multi-phase flow fluids. However, this is not always practical or possible. The approach discussed herein is not to avoid multi-phase decoupling and SOS/compressibility effects, but instead to operate a flow meter in such a way as to generate a known and substantially constant error effect. As a result, derivations of flow measurements are simplified. Errors in measurement can be then removed.

It has been discovered that the decoupling effects can reach an upper limit. This upper limit provides heretofore unrecognized benefits. For example, if the flow fluid is vibrated at a high enough frequency, then the decoupling effect will reach a predictable upper limit. It has been found that for entrained gas at very high vibrational frequencies, the decoupling effect will be no more than about 3:1, i.e., a gas bubble will move about three times as far as the liquid component moves. It has been found that for entrained solids at very high vibrational frequencies, the decoupling effect will be about equal to the quantity $3/(1+(2*\rho_p/\rho_f))$. If the density of the solid particle is much greater than the liquid, then the entrained solid particles will remain substantially stationary while the liquid component moves with the flow conduit vibration.

Compressibility will not apply to entrained solids. Consequently, the very high frequency vibratory flow meter 5 can be vibrated at a frequency equal to or greater than the upper limit frequency for the decoupling. Any resulting SOS/compressibility effects can be compensated for using conventional techniques.

The upper limit may be independent of flow conduit size, shape, or geometry. The upper limit may be independent of the liquid component. The upper limit may be primarily dependent on a density ratio between the liquid component and the foreign material.

The very high frequency capability of the very high frequency vibratory flow meter 5 can be achieved through appropriate design parameters. One approach to producing the very high frequency vibratory flow meter 5 is to increase a drive signal frequency. This can be done independently from the resonant frequency of the flow meter 5. For example, the flow meter 5 can be operated at higher bending modes.

Another approach to producing the very high frequency vibratory flow meter 5 is that the meter's stiffness must be increased in order to increase the operating frequency and/or resonant (or natural) frequency, along with a conduit amplitude. The meter stiffness can be increased in any manner. However, several likely ways are discussed below.

A factor in meter stiffness is a flow conduit length. The flow meter length is substantially correlated to meter stiffness, wherein decreasing the meter length will translate to some increase in meter stiffness and operational frequency. Consequently, the flow meter length can be chosen in order to achieve at least some meter stiffness increase.

A factor in meter stiffness is a flow conduit aspect ratio. For purposes of this discussion, the flow meter aspect ratio is defined as a flow meter height (H) divided by the flow meter length (L), where the aspect ratio=(H/L) (see FIG. 3). Where the height (H) is less than the length (L), the height-to-length aspect ratio (H/L) will be less than one. Where the flow meter is a straight flow meter, the height-to-length aspect ratio (H/L) will be effectively zero. Where the height (H) is greater than the length (L), the height-to-length aspect ratio (H/L) will be greater than one. For example, in the flow meter 5 of FIG. 2, the height-to-length aspect ratio (H/L) will be significantly larger than one and can reach a relatively high number. Decreasing the height-to-length aspect ratio (H/L) will increase the meter stiffness and the meter resonant frequency. As a consequence, the height-to-length aspect ratio (H/L) can be chosen in order to achieve at least some meter stiffness increase.

A factor in meter stiffness is a flow conduit material. The flow conduit material can be selected in order to achieve at least some meter stiffness increase and a corresponding vibrational frequency increase.

A factor in meter stiffness is flow conduit thickness. The flow conduit thickness can be increased in order to achieve at least some meter stiffness increase. The flow conduit thickness can be increased by any suitable amount. However, as a practical matter, substantial increases in flow conduit thickness can result in an increased weight.

A factor in meter stiffness is a flow conduit shape. The flow conduit shape can be designed in order to achieve at least some meter stiffness increase. The flow conduit shape can be modified in any desirable fashion, including using conduits of substantially round, elliptical, rectangular, irregular, or other suitable shapes.

A factor in meter stiffness is a flow conduit geometry. The flow conduit geometry can be designed in order to achieve at least some meter stiffness increase. The flow conduit geometry can be affected in any desirable fashion, including the use of appropriate straight and curved sections, for example. For example, a straight flow conduit has a greater stiffness than a U-shaped conduit flow meter of the same length.

A factor in meter frequency is a flow conduit mass. The resonant frequency of the flow meter assembly 10 will rise as the flow conduit mass is decreased. The flow conduit mass can be decreased in any desirable fashion, including through the use of lighter flow conduits.

A factor in meter stiffness is a flow conduit nodal restrictor and vibrational node locations. The flow meter assembly 10 can include one or more nodal restrictors that control a vibration node position and therefore affect the bending axis and the vibrational response. A common nodal restrictor in the embodiment shown comprises the spacer 106 in combination with the manifolds 102 and 102'. Alternatively, in other embodiments the nodal restrictor can comprise one or more brace bars that extend rigidly between the two flow conduits at a defined point substantially near to the flanges 101 and 101', i.e., substantially at the two ends of the flow meter 5 (not shown). The one or more nodal restrictors are included in order to fix the vibrational nodes of the curved flow conduits 103A and 103B, creating desired bending axes. The one or more nodal restrictors can be positioned in order to decrease the length of the flow conduits that experience the vibration, thereby increasing a resonant frequency of the very high frequency vibratory flow meter 5.

As a result of careful meter design, the very high frequency vibratory flow meter 5 can be operated at very high frequencies. The very high frequency operation will result in the decoupling being maintained at or near a decoupling ratio of 3:1 for entrained gas or about $3/(1+(2*\rho_p/\rho_f))$ for entrained solids. In addition, the very high frequency operation will result in flow characteristics similar to a flow in which viscosity is effectively zero. As a consequence, the foreign material in the multi-phase flow fluid moves predictably with respect to the flow fluid liquid component. This is true whether the foreign material comprises gas or solid components. This is true whether the foreign material is of a moderately different density than the flow fluid or whether the foreign material has a greatly differing density. As a consequence, the entrained foreign material will not substantially affect the measurements performed by the very high frequency vibratory flow meter 5 after the predictable errors due to decoupling and SOS/compressibility effects have been removed. Further, the flow meter 5 will operate consistently and predictably regardless of variations in gas void fraction (GVF) and/or solids fraction, while being able to satisfactorily measure the flow fluid even as the composition of the multi-phase flow fluid varies, as discussed below in conjunction with equations (13-19).

The meter electronics 20 generates a drive signal to the drive 104 and so can be configured to drive/vibrate the flow meter assembly 10 at the very high frequency. As is common practice in vibratory flow meters, this entails the meter electronics 20 generating a drive signal of a predetermined frequency, wherein the predetermined frequency can be affected and modified by feedback taken from the pickoff signals. For example, the drive signal can be controlled according to the feedback in order to achieve a resonant (i.e., natural) frequency in the vibrational response as measured by the pickoff sensors 105 and 105'. The meter electronics 20 can be configured to operate at higher bending modes.

The meter electronics 20 can be configured to generate the very high frequency in various ways. The meter electronics 20 can be configured during manufacture, such as by appropriately programming a memory of the meter electronics 20. Alternatively, the meter electronics 20 can be configured with the very high frequency during a calibration process, for example, where the very high frequency programming in some embodiments may depend on the measured or determined meter stiffness as determined by the calibration process. In another alternative, the very high frequency can be derived or determined during a meter start-up operation. For example, the very high frequency can be based on pre-stored or user entered values. This may include, for example, a very high frequency that is based on pre-stored or user-entered information regarding the nature of the multi-phase flow fluid.

Coriolis mass flow meters and vibratory densitometers require that the flow fluid move with the flow conduits during oscillation at the meter's natural frequency. When foreign material is introduced, this assumption is no longer valid, as there is relative motion or decoupling between the two or more phases. A model has been developed to predict the conditions that are needed for a good mixture density measurement, given specific meter operating conditions. The fluids model, which has been validated experimentally, can predict decoupling effects. The equations to find a decoupling ratio $(A_p/A_f)$ and a decoupling phase angle ($\phi$) are:

$$m_p \frac{dv}{dt} = F_{drag} + F_{history} + F_{addedmass} + F_{buoyancy} \tag{1}$$

The decoupling ratio $(A_p/A_f)$ comprises the ratio of the particle amplitude $(A_p)$ versus the flow conduit amplitude $(A_f)$. The particle can comprise any foreign material, including gas bubbles, solid particles, or even portions of a different fluid entrained within the flow fluid. The individual terms of equation (1) are defined as:

$$F_{drag} = 6\pi\mu_f a(u-v)\phi(Re) \tag{2}$$

$$F_{history} = 6\pi\mu_f a\left(\frac{u-v}{\delta} + \frac{\delta t_v}{2}\frac{d(u-v)}{dt}\right) \tag{3}$$

$$F_{addedmass} = \frac{2}{3}\pi\rho_f a^3\left(\frac{du}{dt} - \frac{dv}{dt}\right) \tag{4}$$

$$F_{buoyancy} = \frac{4}{3}\pi\rho_f a^3\frac{du}{dt} \tag{5}$$

The motion of the flow fluid is assumed to match the motion of the flow conduit. The motion of the bubble or particle is calculated as:

$$\text{Fluid Velocity}=u=A_f\cos(\omega t) \tag{6}$$

$$\text{Particle Velocity}=v=A_p\cos(\omega t+\phi) \tag{7}$$

The inverse Stokes number ($\delta$) comprises:

$$\delta = \sqrt{\frac{2\eta}{\omega a^2}} \tag{8}$$

The inverse Stokes number ($\delta$) takes into account the flow fluid kinematic viscosity ($\eta$), the angular vibrational frequency ($\omega$), and the particle or bubble radius (a) of the foreign material. The kinematic viscosity ($\eta$) comprises the dynamic viscosity ($\mu$) divided by the density ($\rho$) of the fluid, i.e., $\eta=\mu/\rho$. The foreign material can include entrained gas or entrained solids, as previously discussed. The inverse Stokes number ($\delta$) therefore may be used to more completely and accurately determine an upper vibrational frequency limit than is possible through just a frequency specification.

As the density ratio increases past about 50, the decoupling ratio is dependent primarily on the inverse Stokes number ($\delta$). This is especially important because all gas/liquid mixtures have high density ratios, usually above 100. Thus, for the most common multiphase flow conditions in a vibratory flow meter, the extent of measurement error depends primarily on the inverse Stokes number ($\delta$). Therefore, if the inverse Stokes number ($\delta$) is very small, the result approaches the inviscid case of a 3:1 decoupling ratio, while if the parameter is large, relative motion is restricted and the decoupling ratio approaches 1:1. The inverse Stokes number ($\delta$) illustrates that the balance between fluid kinematic viscosity, particle size, and frequency is important, not any one of these variables alone. However, frequency is controlled by meter design characteristics, while viscosity and particle or bubble size depend on complex and often uncontrollable process conditions.

For the purpose of operating a vibratory flow meter at a high vibrational frequency in order to operate in a predictable and expected multi-phase regime, the inverse Stokes number ($\delta$) can be used to determine whether the vibrational frequency is high enough. The inverse Stokes number ($\delta$) in some embodiments comprises a number lower than about 0.1. The inverse Stokes number ($\delta$) in some embodiments comprises a number lower than about 0.01.

The above equations can be used to find particle motion in the oscillating environment of a vibratory flow meter to within about plus or minus ten percent accuracy for the vibrational amplitude and phase difference in most situations.

The six inputs needed to solve the above equations for bubble motion are: the vibrational response frequency (f), the vibrational response amplitude ($A_f$), the fluid density ($\rho_f$), the particle density ($\rho_p$) of the foreign material particles entrained in the flow fluid, the flow fluid viscosity, and the particle size distribution (a) of the foreign material entrained in the flow fluid. The vibrational response frequency (f) and the vibrational response amplitude ($A_f$) can be determined from the vibrational response of the one or more flow conduits (103A, 103B), such as from the vibrational response signal generated by the pick-offs (105, 105'). The fluid density ($\rho_f$) may be specified by a user, such as in the case of a known flow fluid, or can be obtained by measurement. The particle density ($\rho_p$) may be specified by a customer or alternatively may be determinable from the ideal gas law in the case of entrained gas, given a measured temperature and pressure of the flow fluid. The viscosity may be specified by a customer, such as in the case of a known flow fluid, or can be obtained by measurement. The particle size distribution (a) may be specified by a customer, such as in the case of a known flow fluid, or can be obtained by measurement, including acoustic or radiation measurements of foreign material particles or bubbles in the flow fluid.

High frequency meters typically have not worked well for entrained gas applications. The main reason for the poor performance is that the decoupling ratio is very high, usually more than 2:1. Also, the speed of sound effects cause additional errors, which are predicted by the model:

$$\rho_{vos,err} = \frac{1}{4}\left(\frac{\omega d}{2c_{mix}}\right)^2 \times 100 \quad (9)$$

$$\dot{m}_{vos,err} = \frac{1}{2}\left(\frac{\omega d}{2c_{mix}}\right)^2 \times 100 \quad (10)$$

The angular frequency of vibration ($\omega$) is related to the vibrational frequency by $\omega = 2\pi f$. The speed of sound of the mixture ($c_m$) can be calculated with a well-known equation (see below). The diameter of the flow tube (d) is known.

The amplitude ratio and the phase delay between the flow fluid and foreign material entrained therein are, in general, extremely complex functions of particle size, particle density, fluid density, frequency, fluid oscillation amplitude, and fluid viscosity. Some of these parameters are difficult to measure, including particle size, as they depend on many other factors, including pipeline configuration, for example.

Unlike the viscous model, an inviscid model for particle motion is dependent only on the densities of both phases, which are often known to reasonable precision. In addition, in the inviscid model, motion is independent of particle size and can be represented as:

$$\left(1 + \frac{2\rho_p}{\rho_f}\right)\frac{dv}{dt} = 3\frac{du}{dt} \quad (11)$$

In general, the inviscid model (i.e., a fluid that exhibits no viscosity) is not applicable to a vibratory flow meter, as a vibratory flow meter is commonly used to measure viscous fluids. Even water has enough viscosity to significantly affect the results. However, it turns out that as the vibrational frequency is increased, the physics of the oscillatory flow are more and more similar to the inviscid case, even for a fluid with some viscosity. If oscillation frequency is very high, for example 2,000 Hz, then the inviscid model applies and a gas bubble moves about 3 times further than the fluid, with no phase delay. In general, this is a bad thing for measurements. More decoupling means more density and mass flow error. However, the significant advantage of operating at this high frequency is that bubble and particle motions only depend on the density ratio. The foreign material motion, whether gas or solid, does not depend on the size distribution, which is usually unknown, and may be impossible to determine.

The density error due to decoupling for arbitrary decoupling ratios can be predicted according to:

$$\rho_{error} = \rho_{meter} - \rho_{mix} = -(\rho_f - \rho_p)\phi_p\left(\frac{A_p}{A_f} - 1\right) \quad (12)$$

At high frequencies, the SOS/compressibility effects will be important and are added in, yielding:

$$\rho_{meter} - \rho_{mix} = \frac{\rho_{mix}}{4}\left(\frac{\omega(d/2)}{c_{mix}}\right)^2 - (\rho_f - \rho_p)\phi_p\left[\left(\frac{A_p}{A_f}\right) - 1\right] \quad (13)$$

The above equation describes the density error as a deviation from a true mixture density due to the combined effects of SOS/compressibility and decoupling. If all six input parameters to the particle motion equations are known, the decoupling ratio ($A_p/A_f$) can be calculated generally for any frequency. However, if the meter is operating at a very high frequency, then the decoupling ratio ($A_p/A_f$) is known to be about three for gas bubbles in a liquid, i.e., a bubble will move about three times the distance as the flow fluid, albeit without any phase delay. Consequently, for a satisfactorily high vibrational frequency, equation (13) becomes:

$$\rho_{meter} - \rho_{mix} = \frac{\rho_{mix}}{4}\left(\frac{\omega(d/2)}{c_{mix}}\right)^2 - 2(\rho_f - \rho_p)\phi_p \quad (14)$$

Now the equation depends only on quantities that are generally known in many processes. Three other equations are needed in order to simultaneously solve and determine the four unknowns ($\phi_f$, $\phi_p$, $\rho_{mix}$, $c_{mix}$), where the ($\phi_f$) term is the liquid fraction, the ($\phi_p$) term is the particle/gas fraction, the ($\rho_{mix}$) term is the multi-phase flow fluid (i.e., mixture) density, and the ($c_{mix}$) term is the speed of sound in the mixture.

$$\rho_{mix} = \rho_f \phi_f + \rho_p \phi_p \quad (15)$$

$$\varphi_f + \varphi_p = 1 \quad (16)$$

-continued $$\frac{1}{\rho_{mix} c_{mix}^2} = \frac{\phi_f}{\rho_f c_f^2} + \frac{\phi_p}{\rho_p c_p^2} \quad (17)$$

Equations (14-17) can be solved simultaneously for the volume fractions, the mixture density, and the mixture speed of sound. Thus, at a high vibrational frequency, the gas fraction and liquid fraction can be determined. From the determined gas and liquid fractions, the flow rates of the two components can be estimated, either in mass or volume (this assumes no bubble slip and instead assumes that the bubble moves at the same velocity down the pipeline as the liquid). These flow rates would otherwise be unknown because a Coriolis meter or densitometer measures a mixture density, even when no decoupling or SOS/compressibility effects are present. Calculation of a liquid mass or volume flow rate is desirable because the user typically only cares about the liquid measurement. This calculation of rates comes from simultaneously solving two more linearly independent equations:

$$\dot{m}_{mix} = \dot{m}_f + \dot{m}_p \quad (18)$$

$$\frac{\dot{m}_{mix}}{\rho_{mix}} = \frac{\dot{m}_f}{\rho_f} + \frac{\dot{m}_p}{\rho_p} \quad (19)$$

Where ($\dot{m}_f$) is the flow fluid mass flow rate, the ($\dot{m}_p$) term is the foreign material particle mass flow rate, and the ($\dot{m}_{mix}$) term is the multi-phase mixture mass flow rate. The above equation assumes no slippage between the foreign material and the flow fluid.

It is possible to vibrate the flow conduit at additional resonant bending mode frequencies to determine the phase fractions for a mixture which includes more than two components. For example, consider the following oil, water, and gas mixture. The system of equations to be solved, with five unknowns, ($\phi_g$, $\phi_w$, $\phi_o$, $\rho_{mix}$, $c_{mix}$), comprises:

$$\phi_g + \phi_w + \phi_o = 1 \quad (20)$$

$$\phi_g \rho_g + \phi_w \rho_w + \phi_o \rho_o = \rho_{mix} \quad (21)$$

$$\frac{1}{\rho_{mix} c_{mix}^2} = \frac{\phi_g}{\rho_g c_g^2} + \frac{\phi_w}{\rho_w c_w^2} + \frac{\phi_o}{\rho_o c_o^2} \quad (22)$$

$$\frac{\rho_{low,high} - \rho_{mix}}{\rho_{mix}} = \frac{1}{4} \left( \frac{\omega_{low,high}(d/2)}{c_m} \right)^2 \quad (23)$$

There are really five equations, as the last one is being applied at both a low frequency bending mode and a high frequency bending mode. The subscripts represent oil (o), water (w), and gas (g).

In this case, because we vibrate at both a low and a high frequency, gas bubble size must be very small to avoid bubble slip and decoupling. Alternatively, the meter could be vibrated in a very low and very high frequency bending mode simultaneously, in which case the system of equations may be solved with proper consideration of the various forms of equation (23).

In many cases, bubble size is not small enough to make these assumptions (especially in a meter employing a moderate to high vibrational frequency). However, decoupling can be added back into the equation so that the method works in general by applying equation (13) at the high and low modes. As always, the problem is what to use for the decoupling ratio ($A_p/A_f$), assuming it cannot be explicitly calculated. At least in the high mode, the decoupling ratio ($A_p/A_f$) will be nearly or approximately three. In a low frequency mode, it can be assumed that the frequency was low enough to neglect decoupling, i.e., where the decoupling ratio ($A_p/A_f$) is approximately one. Alternatively, an intermediate value can be assumed and used.

What is claimed is:

1. A very high frequency vibratory flow meter (100), comprising:
    a flow meter assembly (10) including one or more flow conduits (103A, 103B), with the flow meter assembly (10) being configured to generate a very high frequency response that is above a predetermined maximum decoupling frequency for the flow fluid independent of a foreign material size or a foreign material composition; and
    meter electronics (20) coupled to the flow meter assembly (10) and configured to receive the very high frequency vibrational response and generate one or more flow measurements therefrom.

2. The very high frequency vibratory flow meter (100) of claim 1, wherein the meter electronics (20) is configured such that a decoupling ratio ($A_p/A_f$) is about 3:1 for entrained gas at the very high frequency.

3. The very high frequency vibratory flow meter (100) of claim 1, wherein the meter electronics (20) is configured such that a decoupling ratio ($A_p/A_f$) is about equal to the quantity $3/(1+(2*\rho_p/\rho_f))$ for entrained solids at the very high frequency.

4. The very high frequency vibratory flow meter (100) of claim 1, wherein the meter electronics (20) is configured such that a viscosity is effectively zero with regard to particle motion for the flow fluid at the very high frequency.

5. The very high frequency vibratory flow meter (100) of claim 1, with the very high frequency vibrational response corresponding to an inverse Stokes number ($\delta$) that is less than about 0.1.

6. The very high frequency vibratory flow meter (100) of claim 1, with the very high frequency being above about 1,500 Hertz (Hz).

7. The very high frequency vibratory flow meter (100) of claim 1, with the very high frequency being above about 2,000 Hertz (Hz).

8. The very high frequency vibratory flow meter (100) of claim 1, wherein the one or more flow conduits (103A, 103B) are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

9. The very high frequency vibratory flow meter (100) of claim 1, with the very high frequency vibratory flow meter being configured to operate at a first bending mode.

10. The very high frequency vibratory flow meter (100) of claim 1, with the very high frequency vibratory flow meter being configured to operate at higher bending mode frequencies.

11. A method of operating a very high frequency vibratory flow meter, the method comprising:
    vibrating one or more flow conduits of the very high frequency vibratory flow meter at a very high frequency, wherein the very high frequency is above a predetermined maximum decoupling frequency for the flow fluid independent of a foreign material size or a foreign material composition;

receiving a very high frequency vibrational response; and generating one or more flow measurements from the very high frequency vibrational response.

12. The method of claim 11, with the very high frequency vibratory flow meter being configured such that a decoupling ratio ($A_p/A_f$) is about 3:1 for entrained gas at the very high frequency.

13. The method of claim 11, with the very high frequency vibratory flow meter being configured such that a decoupling ratio ($A_p/A_f$) is about equal to the quantity $3/(1+(2*\rho_p/\rho_f))$ for entrained solids at the very high frequency.

14. The method of claim 11, with the very high frequency vibratory flow meter being configured such that a viscosity is effectively zero with regard to particle motion for the flow fluid at the very high frequency.

15. The method of claim 11, with the very high frequency vibrational response corresponding to an inverse Stokes number ($\delta$) that is less than about 0.1.

16. The method of claim 11, with the very high frequency being above about 1,500 Hertz (Hz).

17. The method of claim 11, with the very high frequency being above about 2,000 Hertz (Hz).

18. The method of claim 11, wherein one or more flow conduits of the very high frequency vibratory flow meter are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

19. The method of claim 11, with the very high frequency vibratory flow meter being configured to operate at a first bending mode.

20. The method of claim 11, with the very high frequency vibratory flow meter being configured to operate at higher bending mode frequencies.

21. A method of forming a very high frequency vibratory flow meter, the method comprising:

determining a predetermined very high frequency for the vibratory flow meter based on at least an expected flow fluid, wherein the very high frequency is above a predetermined maximum decoupling frequency for the flow fluid independent of a foreign material size or a foreign material composition;

configuring the very high frequency vibratory flow meter to operate at the very high frequency; and constructing the very high frequency vibratory flow meter.

22. The method of claim 21, wherein the meter electronics is configured such that a decoupling ratio ($A_p/A_f$) is about 3:1 for entrained gas at the very high frequency.

23. The method of claim 21, wherein the meter electronics is configured such that a decoupling ratio ($A_p/A_f$) is about equal to the quantity $3/(1+(2*\rho_p/\rho_f))$ for entrained solids at the very high frequency.

24. The method of claim 21, wherein the meter electronics is configured such that a viscosity is effectively zero with regard to particle motion for the flow fluid at the very high frequency.

25. The method of claim 21, with the very high frequency vibrational response corresponding to an inverse Stokes number ($\delta$) that is less than about 0.1.

26. The method of claim 21, with the very high frequency being above about 1,500 Hertz (Hz).

27. The method of claim 21, with the very high frequency being above about 2,000 Hertz (Hz).

28. The method of claim 21, wherein the one or more flow conduits are configured to achieve the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

29. The method of claim 21, with the very high frequency vibratory flow meter being configured to operate at a first bending mode.

30. The method of claim 21, with the very high frequency vibratory flow meter being configured to operate at higher bending mode frequencies.

\* \* \* \* \*